United States Patent
Schmitt (10) Patent No.: US 6,570,659 B2
(45) Date of Patent: May 27, 2003

(54) BROADBAND LIGHT SOURCE SYSTEM AND METHOD AND LIGHT SOURCE COMBINER

(75) Inventor: Joseph M. Schmitt, Andover, MA (US)

(73) Assignee: LightLab Imaging, LLC, Westford, MA (US)

(*) Notice: Subject to any disclaimer, the term of this patent is extended or adjusted under 35 U.S.C. 154(b) by 75 days.

(21) Appl. No.: 09/811,054

(22) Filed: Mar. 16, 2001

(65) Prior Publication Data

US 2002/0131049 A1 Sep. 19, 2002

(51) Int. Cl.⁷ ................................. G01B 9/02
(52) U.S. Cl. .......................... 356/479; 356/497
(58) Field of Search ................. 356/458, 459, 356/489, 479, 450, 497; 250/201.9, 208.1, 216, 205; 382/312, 254, 255

(56) References Cited

U.S. PATENT DOCUMENTS

| | | | |
|---|---|---|---|
| 4,356,731 A | 11/1982 | Mahony | 73/631 |
| 4,387,955 A | 6/1983 | Ludman et al. | 350/96.19 |
| 4,923,270 A | 5/1990 | Carter | 350/96.18 |
| 5,026,131 A | 6/1991 | Jannson et al. | 350/3.7 |
| 5,062,150 A | 10/1991 | Swanson et al. | 359/152 |
| 5,108,183 A | 4/1992 | Fling et al. | 356/350 |
| 5,163,058 A | 11/1992 | Farries et al. | 372/6 |
| 5,291,267 A * | 3/1994 | Sorin et al. | 356/345 |
| 5,321,501 A | 6/1994 | Swanson et al. | 356/345 |
| 5,396,569 A * | 3/1995 | Yanagawa et al. | 385/24 |
| 5,459,570 A | 10/1995 | Swanson et al. | 356/345 |
| 5,731,876 A * | 3/1998 | Venkatesh et al. | 356/357 |
| 6,002,480 A * | 12/1999 | Izatt et al. | 356/345 |
| 6,075,596 A * | 6/2000 | Pan et al. | 356/345 |
| 6,188,481 B1 * | 2/2001 | Kumar | 356/489 |
| 6,256,102 B1 * | 7/2001 | Dogariu | 356/479 |
| 6,351,325 B1 * | 2/2002 | Mandella et al. | 359/210 |
| 6,392,751 B1 * | 5/2002 | Koch et al. | 356/478 |

OTHER PUBLICATIONS

Rao et al., "Synthesized source for white–light sensing systems," *Optics Letters*, (1993) vol. 18, No. 6, pp. 462–464.

* cited by examiner

*Primary Examiner*—Stephone B. Allen
*Assistant Examiner*—Christopher W. Glass
(74) *Attorney, Agent, or Firm*—Testa, Hurwitz & Thibeault, LLP (57) ABSTRACT

A system for generating a source of broadband light includes, in one embodiment, a plurality of light sources such as SLEDs or edge-emitting luminescent diodes (ELEDs) whose outputs are combined in at least one combiner unit. The combiner unit combines light from a plurality of light sources into a single mode output beam. In one embodiment, the single mode output beam is the input beam to an interferometer for optical coherence tomography. In another embodiment, a time-gain compensation (TGC) unit is in communication with the plurality of light sources. The TGC unit controls the plurality of light sources independently and simultaneously. In one embodiment, control of the plurality of light sources by the TGC unit is in synchrony with the variation in optical delay in the reference arm of the interferometer. The TGC unit may feature, for example, a modulated current regulator.

61 Claims, 5 Drawing Sheets

BROADBAND LIGHT SOURCE SYSTEM AND METHOD AND LIGHT SOURCE COMBINER

STATEMENT REGARDING FEDERALLY SPONSORED RESEARCH

This invention was made with government support under a grant entitled "Development of Next-Generation OCT Technology (1998-01-0163A)." which was awarded by the National Institute of Standards and Technology. United States Department of Commerce. The U.S. government has certain rights in the invention.

TECHNICAL FIELD OF THE INVENTION

This invention relates generally to the creation of broadband light sources and to the creation of broadband light sources for imaging applications, such as medical imaging and optical coherence tomography, in particular.

BACKGROUND OF THE INVENTION

There are many industrial, medical, and other applications in which high resolution (generally less than 10 micrometers) measurement of distances, thicknesses, and optical properties of a biological or other sample is required. These applications include measurements of biological tissue, semiconductors, and other materials containing thin layers, as well as non-destructive testing of small structures inside integrated optical circuits, optical connectors, optical couplers, semiconductor lasers and semiconductor optical amplifiers. Medical applications include microsurgery, optical triangulation for in vivo diagnosis using endoscopes, endomicroscopes, retinoscopes, scanning confocal microscopes, and scanning laser ophthalmoscopes. Methods and apparatus for performing high resolution precision measurements on biological and other samples are described in U.S. Pat. Nos. 5,459,570 and 5,321,501, the entirety of each is incorporated by reference herein.

The light source for medical imaging, such as the light source used in the optical coherence tomography (OCT) systems, poses fundamental engineering challenges. OCT light sources must emit high output power into a single mode and have broad spectral bandwidths. Currently available inexpensive light sources typically fail to satisfy these two requirements. For example, the superluminescent diode (SLED), a popular light source of inexpensive OCT systems, can be tailored to produce high optical power at the expense of high spectral bandwidth, or broad spectral bandwidth at the expense of high optical output power. Physical limitations make the fabrication of broadband, high-power SLEDs impractical. The invention described herein overcomes these engineering problems common to prior art light sources.

SUMMARY OF THE INVENTION

In accordance with the invention, apparatus, systems and methods are provided for generating broadband light with high optical power and broad spectral bandwidth. A system for generating a source of broadband light includes, in one embodiment, a plurality of light sources such as SLEDs or edge-emitting luminescent diodes (ELEDs) whose outputs are combined in at least one combiner unit. The combiner unit combines light from a plurality of light sources into a single mode output beam. In one embodiment, the single mode output beam is the input beam to an interferometer for optical coherence tomography.

In another embodiment, a time-gain compensation (TGC) unit is in communication with the plurality of light sources.

The TGC unit controls the plurality of light sources independently and simultaneously. In one embodiment, control of the plurality of light sources by the TGC unit is in synchrony with the variation in optical delay in the reference arm of the interferometer. The TGC unit may feature, for example, a modulated current regulator.

In another embodiment, the plurality of light sources of the broadband light source system have partially overlapping optical spectra.

Other features of the broadband light source system include one or more polarization adjusters in optical communication with the combiner. The polarization adjuster is a polarization loop in one embodiment that adjusts the direction of the polarization axis of each of the output light beams.

In another embodiment of the invention, the light sources are used in a dual-input interferometer comprising a pair of optical circulators.

Light sources of the broadband light source system may be SLEDs or ELEDs. The SLEDs may emit one or more peak wavelengths separated by a fixed interval.

The combiner, in one embodiment, is a truncated star coupler in optical communication with a grating and a plurality of focusing optics, such as lenses. The combiner combines the outputs of the light sources having source bandwidths substantially identical to the fixed interval.

The combiner of the broadband light source according to the invention may be further embodied in a polarization multiplexer or a wavelength division multiplexer. The system according to the invention may further comprise a non-polarization optical combiner.

DETAILED DESCRIPTION OF THE INVENTION

The embodiments of the broadband light source system according to the invention described herein share a common feature in that the output beams of two or more semiconductor light sources are combined by using at least one polarization multiplexer or at least one wavelength-division multiplexer and at least one polarization adjuster to maximize spectral bandwidth and emission power of the combined light output beam. In another embodiment, the light source beams are combined at the input of an interferometer in an OCT system. The broadband light source system according to the invention is useful for many applications such as medical imaging including, but not limited to, microscopy, optical triangulation for in vivo diagnosis using endoscopy, endomicroscopy, retinoscopy, optical coupling, scanning confocal microscopy, and scanning laser ophthalmoscopy.

Figure 1:
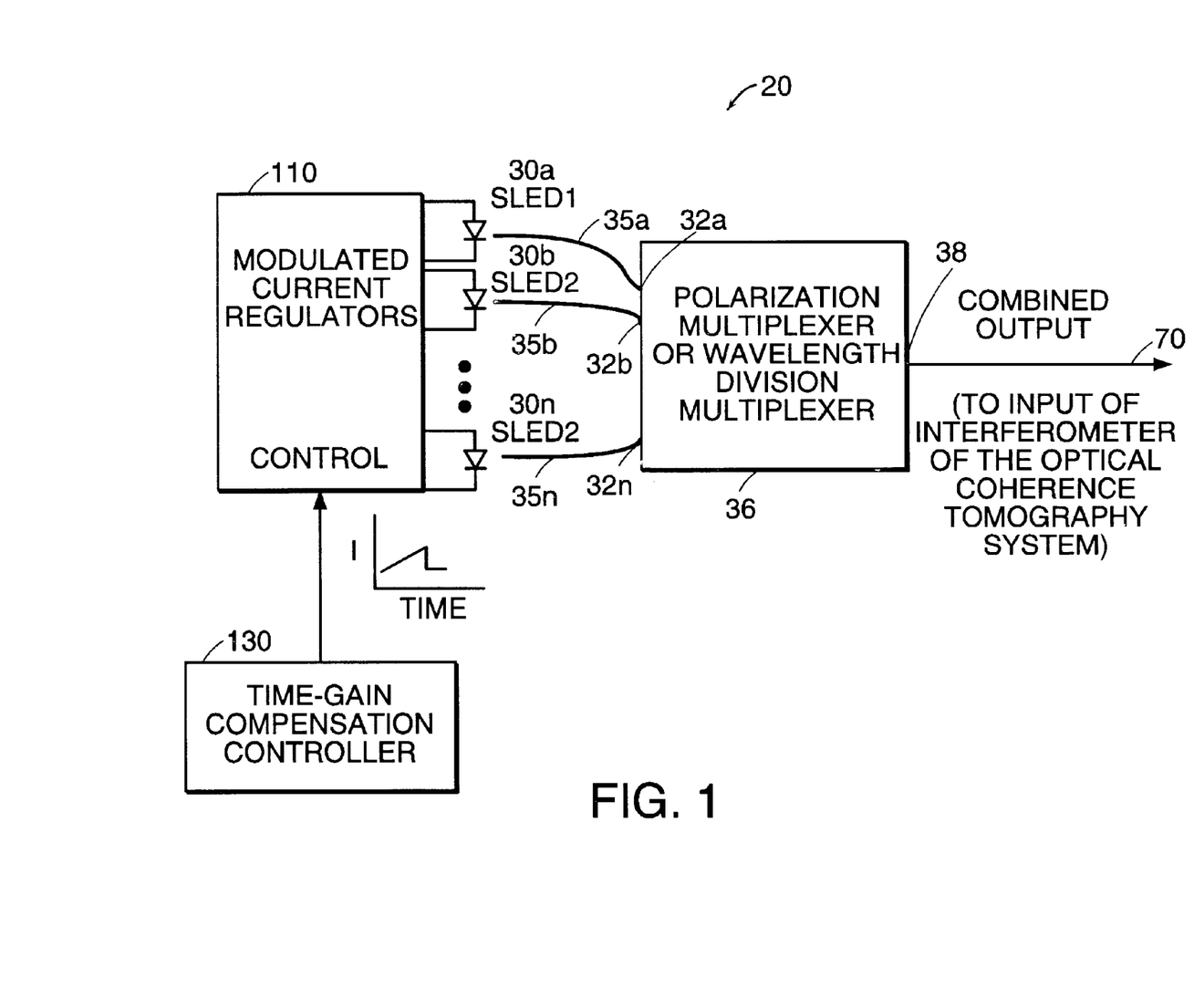
FIG. 1 is a block diagram of an embodiment of a broadband light source system according to the invention.

Referring to FIG. 1, shown is a typical embodiment of a broadband light source system 20 constructed in accordance with the invention. In general, a broadband light source system 20 includes a plurality of semiconductor light sources 30a, 30b, 30n (generally 30), and at least one combiner unit 36. In one embodiment, the plurality of light sources 30 include partially overlapping spectra. In one embodiment, the combiner unit 36 includes at least one multiplexer for combining light from the light sources 30 into a single mode output beam 70, a plurality of input ports 32a, 32b, 32n, generally 32, each in optical communication with a respective one of the plurality of light sources 30 by way of a respective optical fiber 35a, 35b, 35n, generally 35, and a single mode output port 38. In another embodiment of the invention, the plurality of SLEDs 30 serve as broadband light sources. Alternatively, ELEDs may be used to provide the broadband light. (For the purposes of this specification, SLEDs and ELEDs are used interchangeably). In another embodiment, the broadband light source system 20 includes a current regulator 110, and/or a time-gain compensation controller 130.

Figure 2:
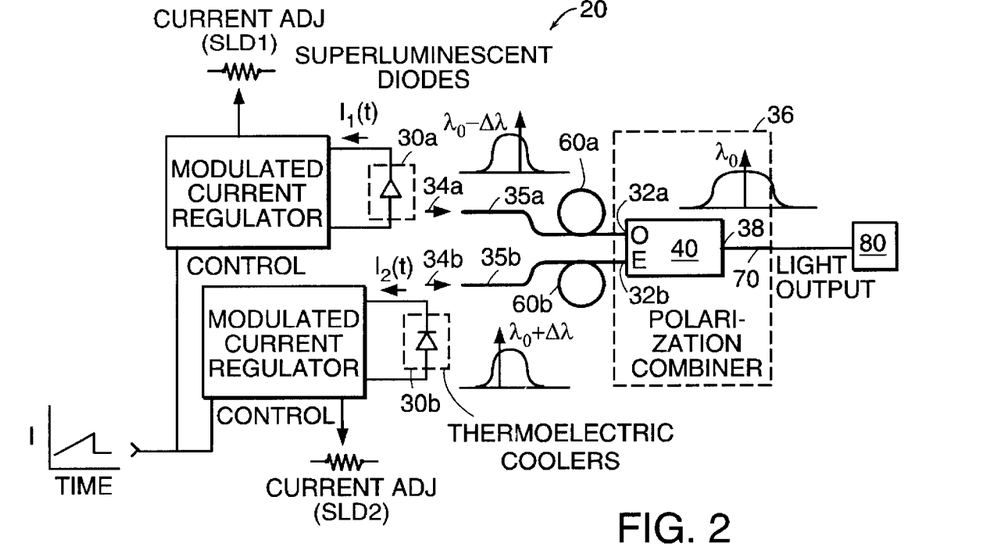
FIG. 2 is a block diagram of a fiber-optic-based, polarization-multiplexing embodiment of a broadband light source designed to combine two superluminescent diode light sources according to the invention.

In one embodiment of the invention illustrated in FIG. 2, each of the input beams 34a, 34b (generally 34) of the light sources 30a, 30b (generally 30) are in optical communication with a respective input port 32a, 32b (generally 32) of the combiner unit 36 through a respective optical fiber 35a, 35b (generally 35). In this embodiment the combiner unit 36 includes a polarization multiplexer 40. This embodiment of the invention also includes a polarization adjustment loop 60a, 60b (generally 60) for each optical fiber 35a, 35b respectively. In operation, before the input beams 34 of the light sources 30 are combined in the polarization multiplexer 40, the polarization vector of each of the input beams 34 is rotated a predetermined amount by polarization adjustment loop 60. The polarization axis of the input beams 34 in a two beam embodiment is adjusted by polarization loops 60 into orthogonal planes. After the polarization vectors of the input beams 34 are adjusted to be orthogonal, the input beams 34 are combined in the polarization multiplexer 40 into a single output beam 70 at the output port 38.

The above-described broadband light source polarization multiplexing system 20 improves input beam 34 coupling efficiency by allowing orthogonal polarization modes to couple independently. The theoretical output power of the dual source polarization multiplexer is $$P_o = \eta[(1-(1/\epsilon_1))P_1 + (1-(1/\epsilon_2))P_2]$$

Where $P_1$, $P_2$ and $\epsilon_1$, $\epsilon_2$, are the powers and polarization extinction ratios respectively, of the output beams 34 from the two light sources 30 and $\eta$ is the efficiency of the polarization beam splitter 50. Light-emitted by high-power SLED sources 30 typically have a polarization extinction ratio in the range 10–15 and the typical efficiency of a high-quality fiber-optic polarization beam splitter exceeds 0.85. Thus, assuming that the SLEDs 30 emit light of equal power, $P_1 = P_2 = P$, the above formula calculates that the output power of the combiner unit will be approximately 1.5 P. If the input beams 34 were combined instead using a standard 2:1 (non-polarized) coupler, more than half of the available power of each input beam 34 would be lost, yielding an output power <1.0 P.

In addition to its efficiency advantage, the polarization multiplexer method described herein when used as the light source for an interferometer, for example, as in optical coherent tomography (OCT), reduces the effects of extraneous variations in birefringence in the sample arm of the interferometer, because the instantaneous polarization of the combined single mode output light beam 70 is composed of a mixture of orthogonal polarization states.

Figure 3:
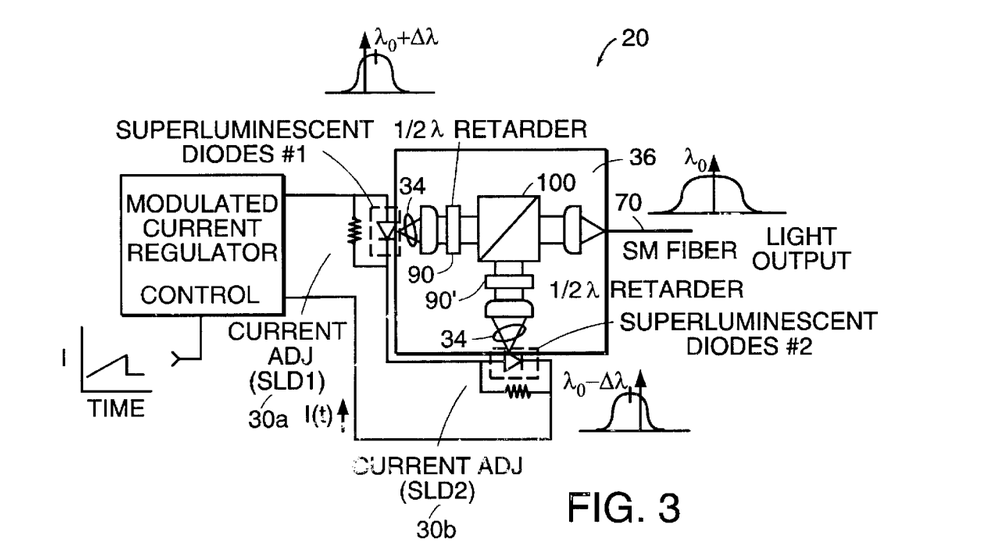
FIG. 3 is a block diagram of an embodiment of a bulk-optic-based, polarization multiplexing broadband light source system according to the invention designed to combine two superluminescent diode light sources.

The version of the broadband light source polarization multiplexer system 20 illustrated in FIG. 2 can also be constructed using bulk optical components. Referring now to FIG. 3, an embodiment of a broadband light source fiber-optic polarization multiplexer system 20 constructed from bulk optical components is illustrated. As shown, combiner unit 36 includes silica retardation plates 90, 90' used in place of fiber polarization loops 60 (shown in FIG. 2) and a fused pair of dielectric-coated glass prisms 100 which serves as the polarization beam combiner (splitter). In an alternate embodiment (not shown), Wollaston or Glan-Thompson prisms can be substituted for the pair of dielectric-coated glass prisms 100.

In one embodiment of the broadband light source polarization multiplexer system 20 used with an interferometer, the effective coherence length of the combined output light beam 70 can be made shorter than the coherence length of individual light beams 34. This is accomplished by using SLEDs 30 or ELEDs as light sources 30 that emit within adjacent, partially overlapping wavelength bands, in conjunction with an interferometer, illustrated in FIG. 1, which sums the amplitudes of the coherence functions of the individual light sources 30.

Figure 4A:
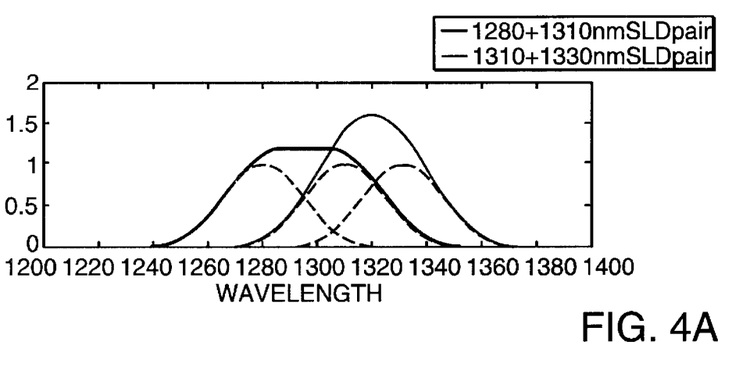
FIGS. 4A and 4B are graphic illustrations of the effect of the spectral overlap of two sources on the spectrum and coherence function of the combined source according to the invention.
Figure 4B:
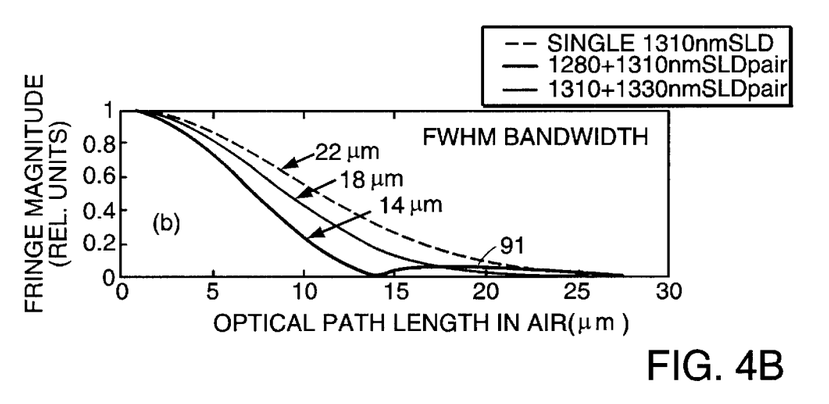

Referring now to FIG. 4A, the peak emission wavelengths and bandwidths of the sources must be chosen carefully to achieve maximum bandwidth (minimum coherence width) at the highest possible output power with acceptable sidelobe amplitudes. By combining a pair of SLEDs 30 or ELEDs whose spectra overlap the proper amount, as shown in FIG. 4B, the full-width-at-half maximum (FWHM) coherence length of the combined output light beam 70 can be reduced to almost one-half that of a single SLED 30 or ELED (e.g., 14 $\mu$m for a 1280/1310 $\mu$m SLED pair versus 22 $\mu$m for a single 1310 $\mu$m SLED), provided that a sidelobe amplitude 91 of 10% or greater can be tolerated.

Figure 5:
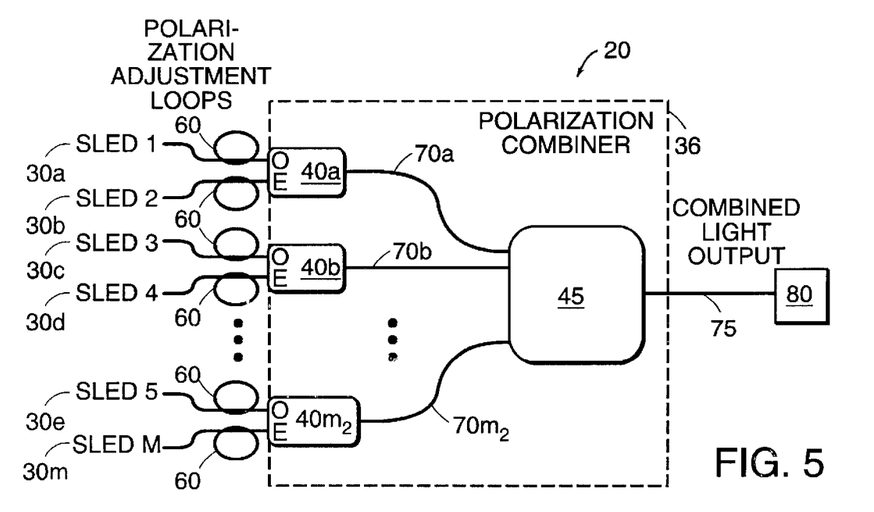
FIG. 5 is a block diagram of an embodiment of a polarization multiplexing broadband light source system according to the invention combining a plurality of superluminescent diode sources.

Another embodiment of the invention, illustrated in FIG. 5, expands the concept to combining the input beams 34 from multiple sources 30(a)–30(m). In this embodiment, the broadband light source polarization multiplexing system 20 includes a combiner unit 36 having a plurality of M/2 polarization multiplexers 40(a) through 40(m/2) for generating a plurality of combined single-mode output light beams 70(a) to 70(m/2), and an (M/2):1 non-polarized multiplexer 45 to combine the single mode output light beams 70(a)–70(m/2) of the plurality of light sources 30 into a single combined output beam 75. For example, illustrated in FIG. 5, each of M/2 polarization combiners 40a, 40b, and 40m/2 combine light from M/2 pairs of M SLEDs. The paired combined light beams 70a, 70b, and 70m/2, are combined in the non-polarizing M/2:1 coupler 45 to generate a combined single mode output light beam 75.

The efficiency of the above-described multiple source polarization multiplexer system 20 can be appreciated by the following analysis. Assuming that all of the light sources 30 emit the same power P and have the polarization extinction ratio $\epsilon$, the theoretical efficiency of the multiplexer is $2\eta_1\eta_2(1-1/\epsilon)M$, where $\eta_1$ and $\eta_2$ are the efficiencies of each of the polarization combiners 40 and M/2:1 coupler 45, respectively. In practice, the attainable efficiency of the multiple-source polarizing multiplexer system 20 is about 1.4 times higher than that of the M/2:1 non-polarizing coupler 45 alone.

Figure 6:
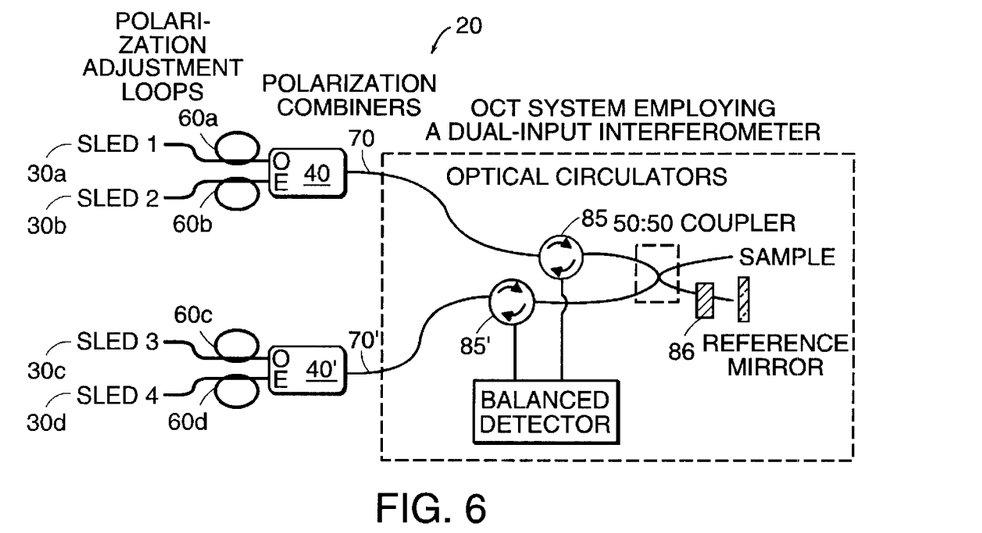
FIG. 6 is a block diagram of an embodiment of a broadband light source system according to the invention in which optical circulators combine the outputs of four superluminescent diodes in an optical coherence tomography system.

In FIG. 6, an application of the broadband light source system 20 in an OCT system is illustrated. In this embodiment, an optical circulator 85, 85' receives a combined input light beam 70, 70' respectively from a respective polarization combiner 40, 40'. The polarization combiner 40, 40' in turn receives light from two SLEDs 30a,b or 30c,d, respectively, through a polarization adjustment loop 60a,b or 60c,d respectively. Each of the combined input light beams 70, 70' are combined directly in the dual input interferometer 80 of the OCT system. Optical circulators 85, 85' obviate the non-polarization coupler, as illustrated in FIG. 5. To ensure that the interference signals generated by the two sources add in phase, a wavelength-dependent phase element 86 (for example, a chirped fiber grating) is placed in the reference arm. This dual optical circulator broadband light source system 20 doubles the overall power efficiency of the broadband light used in the OCT system.

In yet another embodiment of a broadband light source system 20 according to the invention, input light 34(a),(b) . . . (n) from the light sources 30(a),(b) . . . (n), respectively are combined in a wavelength-division multiplexer 40, as illustrated in FIG. 7. The wavelength-division multiplexer (WDM) 40 takes advantage of the ability of the multiplexer 40 to combine light of different wavelengths into a single spatial mode. Unlike existing wavelength-division multiplexers used in the telecommunications industry which combine narrow band light sources having no spectral overlap, the outputs of M broadband SLED sources having partially overlapping emission bands, are coupled through polarization adjustment loops 60 (a),(b) . . . (n) into a fiber-optic M×M star coupler 95.

Figures 7A, 7B:
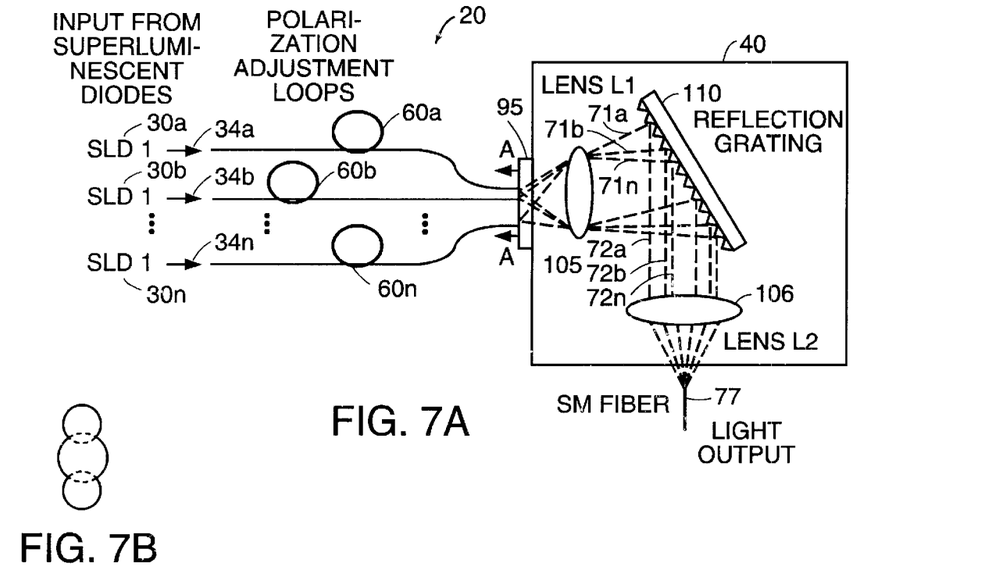
FIG. 7 is a block diagram of an embodiment of a wavelength division multiplexing broadband light source for combining a plurality of superluminescent diode sources.

Fiber optic M×M star coupler 95 has been cleaved to expose the cross-section of tapered fibers as illustrated in FIG. 7B. At the location of the cleaved fibers the fiber cladding is sufficiently thin to allow the reduced diameter cores of adjacent fibers to nearly touch. The fiber-optic cores thus align to form a nearly continuous line source at the focal point of the lens 105. The peak wavelengths of the sources are selected to increase from $\lambda_o-(M/2)\Delta\lambda$ to $\lambda_o+(M/2)\Delta\lambda$ in steps of width $\Delta\lambda$, a wavelength interval approximately equal to the average spectral bandwidth of the sources.

In the WDM, after collimation by lens 105, the light beams 71(a),(b) . . . (n) emitted from the core of fiber impinge on the grating 110 at an angle determined by the distance of the core from the optical axis of the lens 105. By choosing the focal length of the lens 105 such that the angle of light exiting from lens 105 equals the diffraction angle of the grating 110 at the peak wavelength of the light source 30 connected to the fiber, one can ensure that a maximum amount of light 72 from each source 30 couples into the single mode output fiber 77 through lens 106 which refocuses the collimated beams at the face of the fiber 77.

To better illustrate the operating principles of the wavelength-division multiplexer broadband light source system 20, suppose that M=2 and that the fiber cores corresponding to the light sources 30 are positioned a distance $\Delta d/2$ on each side of the optical axis which passes through the center of the lens 105 to the grating 110. Also suppose that the peak wavelengths of the light sources 30 differ by the full-width-at-half-maximum bandwidth of the sources, $\Delta\lambda$, and that the focal lengths of lens 105 and lens 106 both equal $f$. Under these conditions, the collimated beams of light 71 from the sources 30 will exit the lens 105 at angles—$\pm\alpha=\pm\Delta d/2f$, for f<<d.

To ensure that beams 71 focus on the output fiber 77, they must emerge along parallel trajectories as beams 72 in the direction of lens 106. This condition is satisfied when the angular dispersion of the grating 110 equals $\alpha/\Delta\lambda$. The same condition applies in a wavelength-division multiplexer broadband light source system consisting of an arbitrary number of sources, provided that the difference between the peak wavelengths of adjacent light sources 30 equals $\Delta\lambda$ and that the spacing between adjacent fiber cores remains constant at $\alpha d$. The overall efficiency of the wavelength-division multiplexer broadband light source system 20 depends on a number of variables, which include the bandwidth and polarization of the light sources 30, efficiency of the grating 110, fiber core size and spacing, and the focal length and focal spot sizes of the lenses 105 and 106. The theoretical maximum efficiency approaches $\eta_g/2$, (where $\eta_g$ is the diffraction efficiency of the grating 110) when the variables are adjusted to produce a combined light 70 with a flat-topped spectrum. By using the polarization adjustment loops 60, illustrated in FIG. 6, to align the polarization axes of the source beams 34 with the preferred polarization axis of the grating 110, the efficiency of the broadband light source system 20 can be improved.

Individuals skilled in the art of optics will appreciate that various alternative configurations of the wavelength-division multiplexer broadband light source 20 exist that share the same operating principles. The planar reflective grating 110 can be replaced by an equivalent dispersion element, such as a transmission grating or prism (not shown). Alternatively, a concave reflection grating can be used in place of lens 105, lens 106, and the planar grating 110 to diffract and focus the light from the individual light sources 30.

Figure 8:
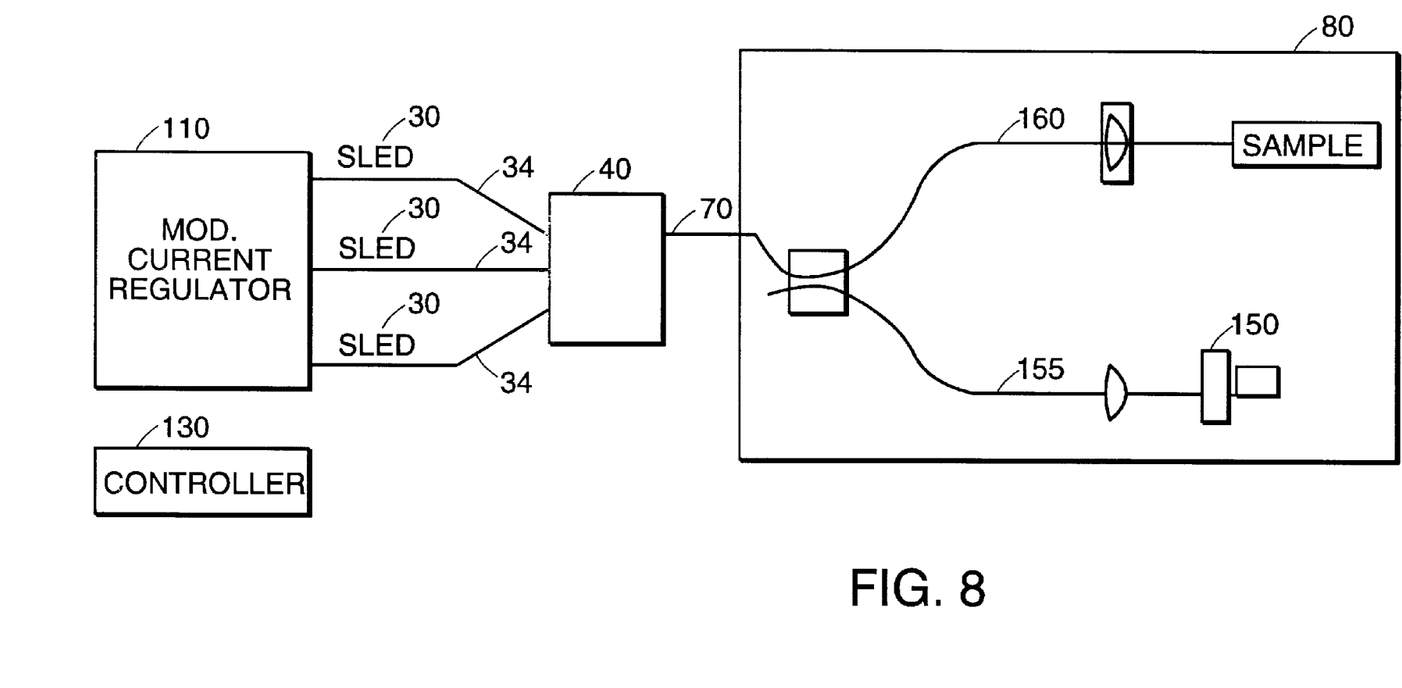
FIG. 8 is a block diagram of a broadband light source according to the invention including a time-gain compensation unit.

Each of the embodiments according to the invention described herein may also feature a time-gain compensation (TGC) module 130, best illustrated in conjunction with an OCT interferometer 80, as shown in FIG. 8. In this illustrative embodiment, the TGC module 130 improves the signal-to-noise ratio and the dynamic range of the OCT system by adjusting the current through the semiconductor light-emitting diodes 30 according to the scan position of the reference mirror 150. In a particular embodiment of the invention, the TGC unit controls a plurality of light sources independently and simultaneously in synchrony with the variation in the optical delay in the reference arm of the interferometer.

In most applications in which an OCT system is used to image biological tissue, the time-gain compensation module is configured, according to one embodiment of the present invention, to increase the current through the SLEDs in linear proportion to the position of the reference beam. Since most SLEDs exhibit an exponential relationship between current and output intensity, in this configuration the intensity of the light source increases exponentially with the reference mirror position, thereby enabling compensation for the average exponential attenuation of light caused by scattering and absorption in the tissue. In another embodiment of the invention which includes a TGC unit, an analog-to-digital converter (A/D converter) controlled by a software-programmable controller is employed. To permit compensation for attenuation within an inhomogeneous sample, the A/D converter establishes an arbitrary non-linear relationship between the SLED current and reference mirror position while maintaining the lowest possible SLED duty cycle for output power efficiency.

Conventional TGC subsystems adjust the gain of the receiver as a function of time to compensate for attenuation of the probe beam with depth of penetration into the medium, which leads to an improvement of the dynamic range of the system 20. The signal-to-noise ratio and the dynamic range of an OCT system, such as that described in U.S. Pat. Nos. 5,459,570 and 5,321,501, incorporated by reference herein, that employs high-power sources, is limited by the photocurrent generated by the light that returns from the reference arm 155 of the interferometer 80. Consequently, better performance can be obtained by adjusting the source power 30 rather than the receiver gain.

In a particular embodiment, the TGC module 110 in the present invention increases the current through the SLEDs 30 with time as the optical delay in the reference arm 155 of the interferometer 80 increases. As a result, the intensity of the light that strikes the sample increases in proportion to the increasing attenuation of the sample beam 160 with depth in the sample, thereby permitting the SLEDs 30 to operate at higher peak currents for lower effective duty cycles.

One skilled in the art will recognize that other embodiments are possible which are still within the spirit of the invention and it is the intent to limit the invention only by the scope of the appended claims.

What is claimed is:

1. A system for generating a source of broadband light comprising:
    a white-light interferometer comprising a reference arm and a sample arm;
    a plurality of light sources;
    a combiner unit, comprising a plurality of input ports, each input port in optical communication with a respective light source, at least one multiplexing element in communication with said plurality of input ports, and a single-mode output port in optical communication with said multiplexing element, wherein said combiner unit combines light from said plurality of light sources into a single mode output light beam, said single mode output light beam being input to said interferometer; and
    a time-gain compensation unit in communication with said plurality of light sources, said time-gain compensation unit controlling said plurality of light sources independently and simultaneously in synchrony with the variation in the optical delay in the reference arm of said interferometer.

2. The system according to claim 1 wherein said multiplexing element comprises a polarization adjuster in optical communication with said single-mode output port, said polarization adjuster adjusting the direction of the polarization axis of each of said input sources.

3. The system according to claim 1 wherein said interferometer comprises a dual-input interferometer comprising a pair of optical circulators wherein said optical circulators combined with said combiner, permits combination of at least two light sources.

4. The system according to claim 1 wherein said plurality of light sources emit light in adjacent partially overlapping wavelength bands separated by a fixed interval, wherein said multiplexing element comprises a truncated star coupler, a grating, and a plurality of focusing optics, and wherein said multiplexing element combines the outputs of said light sources having source bandwidths substantially identical to said fixed interval.

5. The system of claim 1 wherein said plurality of light sources comprise light-emitting diodes.

6. The system of claim 5 wherein said light-emitting diodes comprise superluminescent light-emitting diodes.

7. The system of claim 5 wherein said plurality of light-emitting diodes comprise edge-emitting diodes.

8. The system of claim 1 wherein said multiplexing element comprises a polarization multiplexer.

9. The system of claim 1 wherein said multiplexing element comprises a wavelength-division multiplexer.

10. The system of claim 1 wherein said time-gain compensation unit comprises a modulated current regulator in electrical communication with said light source.

11. The system of claim 1 further comprising a plurality of polarization adjustment loops in optical communication with a respective one of said light sources.

12. The system of claim 1 further comprising a coupler in optical communication with said plurality of light sources.

13. The system of claim 1 further comprising a polarization beam splitter.

14. The system of claim 1 wherein said broadband light is generated for optical coherence tomography.

15. A system for generating a source of broadband light comprising:
    a white-light interferometer comprising a reference arm and a sample arm;
    a plurality of light sources with partially overlapping optical spectra; and
    a combiner unit, comprising a plurality of input ports, each input port in optical communication with a respective light source, at least one multiplexing element in communication with said plurality of input ports, and a single mode output port in optical communication with said multiplexing element, wherein said combiner unit combines light from said plurality of light sources into a single mode output light beam, said single mode output light beam being input to said interferometer.

16. The system according to claim 15 wherein said multiplexing element comprises a polarization adjuster in optical communication with said single-mode output port, said polarization adjuster adjusting the direction of the polarization axis of each of said input sources.

17. The system according to claim 15 wherein said interferometer comprises a dual-input interferometer comprising a pair of optical circulators wherein said optical circulators combined with said combiner, permits combination of at least two light sources.

18. The system according to claim 15 wherein said light-emitting diodes emit different peak wavelengths of emission separated by a fixed interval, wherein said multiplexing element comprises a truncated star coupler, a grating, and a plurality of focusing optics, and wherein said multiplexing element combines the outputs of said light sources having source bandwidths substantially identical to said fixed interval.

19. The system of claim 15 wherein said plurality of light sources comprise light-emitting diodes.

20. The system of claim 19 wherein said light-emitting diodes comprise superluminescent light-emitting diodes.

21. The system of claim 19 wherein said plurality of light-emitting diodes comprise edge-emitting diodes.

22. The system of claim 15 wherein said multiplexing element comprises a polarization multiplexer.

23. The system of claim 15 wherein said multiplexing element comprises a wavelength-division multiplexer.

24. The system of claim 15 wherein said time-gain compensation unit comprises a modulated current regulator in electrical communication with said light source.

25. The system of claim 15 further comprising a plurality of polarization adjustment loops in optical communication with a respective one of said light sources.

26. The system of claim 15 further comprising a coupler in optical communication with said plurality of light sources.

27. The system of claim 15 further comprising a polarization beam splitter.

28. The system of claim 15 wherein said broadband light is generated for optical coherence tomography.

29. A light source combiner comprising:
a plurality of light sources;
a combiner unit, comprising a plurality of input ports, each input port in optical communication with a respective light source, at least one multiplexing element in communication with said plurality of input ports, and a single-mode output port in optical communication with said multiplexing element, wherein said combiner unit combines light from said plurality of light sources into a single-mode output light beam, said single mode output light beam being input to said interferometer; and
a time-gain compensation unit controlling said plurality of light sources independently and simultaneously.

30. The light source combiner of claim 29 wherein said plurality of light sources comprises light-emitting diodes.

31. The light source combiner of claim 29 wherein said light-emitting diodes comprises superluminescent light-emitting diodes.

32. The light source combiner of claim 30 wherein said light-emitting diodes comprises edge-emitting diodes.

33. The light source combiner of claim 29 wherein said multiplexing element comprises a polarization multiplexer.

34. The light source combiner of claim 29 wherein said multiplexing element comprises a wavelength-division multiplexer.

35. The light source combiner of claim 29 wherein said time-gain compensation unit comprises a modulated current regulator in electrical communication with said light sources.

36. The light source combiner of claim 29 further comprises a plurality of polarization adjustment loops each in optical communication with a respective one of said light sources.

37. The light source combiner of claim 29 further comprising a coupler in optical communication with said plurality of light sources.

38. The light source combiner of claim 29 further comprising a polarization beam splitter.

39. The light source combiner of claim 29 wherein said combined light is applied to optical coherence tomography.

40. A light source combiner comprising:
a plurality of light sources with partially overlapping optical spectra; and
a combiner unit, comprising a plurality of input ports, each input port in optical communication with a respective light source, at least one multiplexing element in communication with said plurality of input ports, and a single mode output port in optical communication with said multiplexing element, wherein said combiner unit combines light from said plurality of light sources into a single mode output light beam.

41. The light source combiner of claim 40 wherein said plurality of light sources comprises light-emitting diodes.

42. The light source combiner of claim 40 wherein said light-emitting diodes comprises superluminescent light-emitting diodes.

43. The light source combiner of claim 41 wherein said light-emitting diodes comprises edge-emitting diodes.

44. The light source combiner of claim 40 wherein said multiplexing element comprises a polarization multiplexer.

45. The light source combiner of claim 40 wherein said multiplexing element comprises a wavelength-division multiplexer.

46. The light source combiner of claim 40 wherein said time gain compensation unit comprises a modulated current regulator in electrical communication with said light sources.

47. The light source combiner of claim 40 further comprises a plurality of polarization adjustment loops each in optical communication with a respective one of said light sources.

48. The light source combiner of claim 40 further comprising a coupler in optical communication with said plurality of light sources.

49. The light source combiner of claim 40 further comprising a polarization beam splitter.

50. A method of generating a broadband light source comprising the steps of:
providing a plurality of light sources, each producing an output light beam;
combining said output light beam into a single mode output light beam; and
adjusting the intensity of each of said plurality light sources in response to said single mode output light beam.

51. The method of claim 50 wherein said plurality of light sources comprises light-emitting diodes.

52. The method of claim 50 wherein said broadband light is generated for optical coherence tomography.

53. The method of claim 51 wherein said light-emitting diodes comprise edge-emitting diodes.

54. The method of claim 51 wherein said light-emitting diodes comprise superluminescent light-emitting diodes.

55. The method of claim 50 wherein said combining step comprises a multiplexing element.

56. The method of claim 55 wherein said multiplexing element comprises a polarization multiplexer.

57. The method of claim 55 wherein said multiplexing element comprises a wavelength-division multiplexer.

58. The method of claim 50 wherein said adjusting step comprises a time gain compensator unit.

59. The method of claim 58 wherein said time gain compensator unit comprises a modulated current regulator in electrical communication with said light sources.

60. The method of claim 50 further comprising the step of rotating the polarization axis of each of the output light beams.

61. The method of claim 60 wherein said rotating step comprises a polarization adjustment loop for each of said output light beams.

* * * * *